(12) United States Patent
Shimazaki (10) Patent No.: US 11,223,078 B2
(45) Date of Patent: Jan. 11, 2022

(54) BATTERY PACK (71) Applicant: TOYOTA JIDOSHA KABUSHIKI KAISHA, Toyota (JP)

(72) Inventor: Rika Shimazaki, Aichi-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 256 days.

(21) Appl. No.: 16/666,753

(22) Filed: Oct. 29, 2019

(65) Prior Publication Data

US 2020/0144683 A1 May 7, 2020

(30) Foreign Application Priority Data

Nov. 6, 2018 (JP) .............................. JP2018-209137

(51) Int. Cl.
*H01M 10/6568* (2014.01)
*H01M 10/0585* (2010.01)
*H01M 10/613* (2014.01)
*H01M 10/6557* (2014.01)

(52) U.S. Cl.
CPC ..... *H01M 10/613* (2015.04); *H01M 10/0585* (2013.01); *H01M 10/6557* (2015.04); *H01M 10/6568* (2015.04)

(58) Field of Classification Search
CPC combination set(s) only.
See application file for complete search history.

(56) References Cited

U.S. PATENT DOCUMENTS

| | | | | |
|---|---|---|---|---|
| 6,761,992 B1* | 7/2004 | Marukawa | .......... | H01M 10/613 429/96 |
| 9,705,156 B2* | 7/2017 | Dorsch | ............ | H01M 10/0525 |
| 2006/0169507 A1* | 8/2006 | Inoue | ................ | H01M 10/6563 180/68.4 |
| 2010/0190049 A1 | 7/2010 | Kawase et al. | | |
| 2012/0009455 A1 | 1/2012 | Yoon | | |
| 2012/0234613 A1* | 9/2012 | Miyatake | ............... | E02F 9/0858 180/65.1 |
| 2012/0301772 A1* | 11/2012 | Hirsch | .............. | H01M 10/6554 429/120 |
| 2013/0011713 A1* | 1/2013 | Harada | ............... | H01M 10/613 429/120 |
| 2013/0130086 A1* | 5/2013 | Schaefer | ........... | H01M 10/6555 429/120 |
| 2013/0202924 A1* | 8/2013 | Kwak | ............... | H01M 10/6561 429/81 |

(Continued)

FOREIGN PATENT DOCUMENTS

CN 102315501 A 1/2012
CN 205609622 U * 9/2016

(Continued)

*Primary Examiner* — Kaity V Chandler
(74) *Attorney, Agent, or Firm* — Dickinson Wright, PLLC (57) ABSTRACT

A battery pack includes one or more clearance adjusting units. Along a direction in which a plurality of cells are arranged, the one or more clearance adjusting unit are disposed intermittently between adjacent pairs of the cells or between sets of adjacent pairs of the cells. Each of the clearance adjusting units includes a pair of plates respectively placed against respective planar portions of the cells adjacent thereto, and an elastic body disposed between the pair of plates.

5 Claims, 4 Drawing Sheets

(56) References Cited

U.S. PATENT DOCUMENTS

| | | | |
|---|---|---|---|
| 2016/0190526 A1* | 6/2016 | Yamada | B60L 50/66 |
| | | | 180/68.5 |
| 2016/0336549 A1* | 11/2016 | Brisbane | H01M 10/625 |
| 2017/0098814 A1* | 4/2017 | Golubkov | H01R 13/696 |
| 2017/0104252 A1* | 4/2017 | Wunsche | H01M 10/647 |
| 2017/0110773 A1* | 4/2017 | Pucher | H01M 10/6556 |
| 2020/0153058 A1 | 5/2020 | Shimazaki | |
| 2020/0153063 A1 | 5/2020 | Shimazaki | |

FOREIGN PATENT DOCUMENTS

| | | | | |
|---|---|---|---|---|
| JP | 2009-026703 A | | 2/2009 |
| JP | 2012022830 A | * | 2/2012 |
| JP | 2013-045578 A | | 3/2013 |
| JP | 2013225432 A | | 10/2013 |

* cited by examiner

BATTERY PACK

CROSS REFERENCE TO RELATED APPLICATIONS

The present application claims priority from Japanese Patent Application No. 2018-209137 filed on Nov. 6, 2018, which is incorporated by reference herein in its entirety.

BACKGROUND

The present disclosure relates to battery packs.

JP 2013-045578 A discloses a battery pack equipped with cooling plates between adjacent battery cells and including a connecting pipe that supplies each of the cooling plates with a refrigerant. It is also disclosed that the connecting pipe is a flexible pipe.

JP 2009-026703 A discloses a battery pack including cells stacked in a stacking direction, wherein an end plate arranged at a stacking end is configured to be capable of changing the thickness with respect to the stacking direction.

SUMMARY

Generally, battery packs are easy to accumulate heat in a certain portion along a stacking direction. Consequently, a temperature variation may occur among the stacked battery cells.

A battery pack disclosed herein includes a plurality of cells, a refrigerant supply pipe, a refrigerant recovery pipe, a plurality of cooling members, one or more clearance adjusting units, and a restraining unit.

Each of the plurality of cells includes a pair of planar portions opposed to each other, and the plurality of cells are arranged such that planar portions of each adjacent pair of the cells are in a face-to-face relationship.

The refrigerant supply pipe extends alongside the plurality of cells arranged side by side, and along a direction in which the plurality of cells are arranged. The refrigerant recovery pipe extends alongside the plurality of cells arranged side by side, and along the direction in which the plurality of cells are arranged. The refrigerant recovery pipe is disposed at a position different from a position where the refrigerant supply pipe is positioned.

Each of the cooling members comprises: a heat transfer plate disposed between each adjacent pair of the cells or between a set of adjacent pairs of the cells wherein the set of adjacent pairs of the cells includes a plurality of adjacent pairs of the cells; a refrigerant flow passage attached to the heat transfer plate; a first flexible tube connected to the refrigerant supply pipe and the refrigerant flow passage; and a second flexible tube connected to the refrigerant flow passage and the refrigerant recovery pipe.

The one or more clearance adjusting units are disposed intermittently are disposed intermittently between adjacent pairs of the cells or between sets of adjacent pairs of the cells, along the direction in which the plurality of cells are arranged. Each of the clearance adjusting units includes a pair of plates respectively placed against respective planar portions of the cells adjacent thereto, and an elastic body disposed between the pair of plates.

The restraining unit includes a pair of restraining members and a support member supporting the pair of restraining members, the pair of restraining members restraining opposite ends of the plurality of cells arranged with the plurality of cooling members interposed.

Such an embodiment of the battery pack makes it possible to reduce temperature variations between the cells by means of the cooling members. Moreover, because the one or more clearance adjusting units are disposed intermittently between adjacent pairs of the cells or between sets of adjacent pairs of the cells, movements of the cells and the heat transfer plates are kept small, and deformation of the first flexible tube and the second flexible tube is also kept small.

The battery pack may include a guide movably guiding the cooling members along the direction in which the plurality of cells are arranged.

One of the pair of plates may be disposed immovably relative to the restraining members. In addition, the other one of the plates may be disposed relatively movably relative to the restraining members.

Each of the cells may be a laminate-type cell including an electrode assembly and a laminate film covering the electrode assembly.

Each of the cells may be an all-solid-state cell.

DETAILED DESCRIPTION

The following describes embodiments of a battery pack disclosed herein. It should be noted, however, that the embodiments described herein are, of course, not intended to limit the present invention. The present invention is not limited to the embodiments described herein unless specifically stated otherwise.

Figure 1:
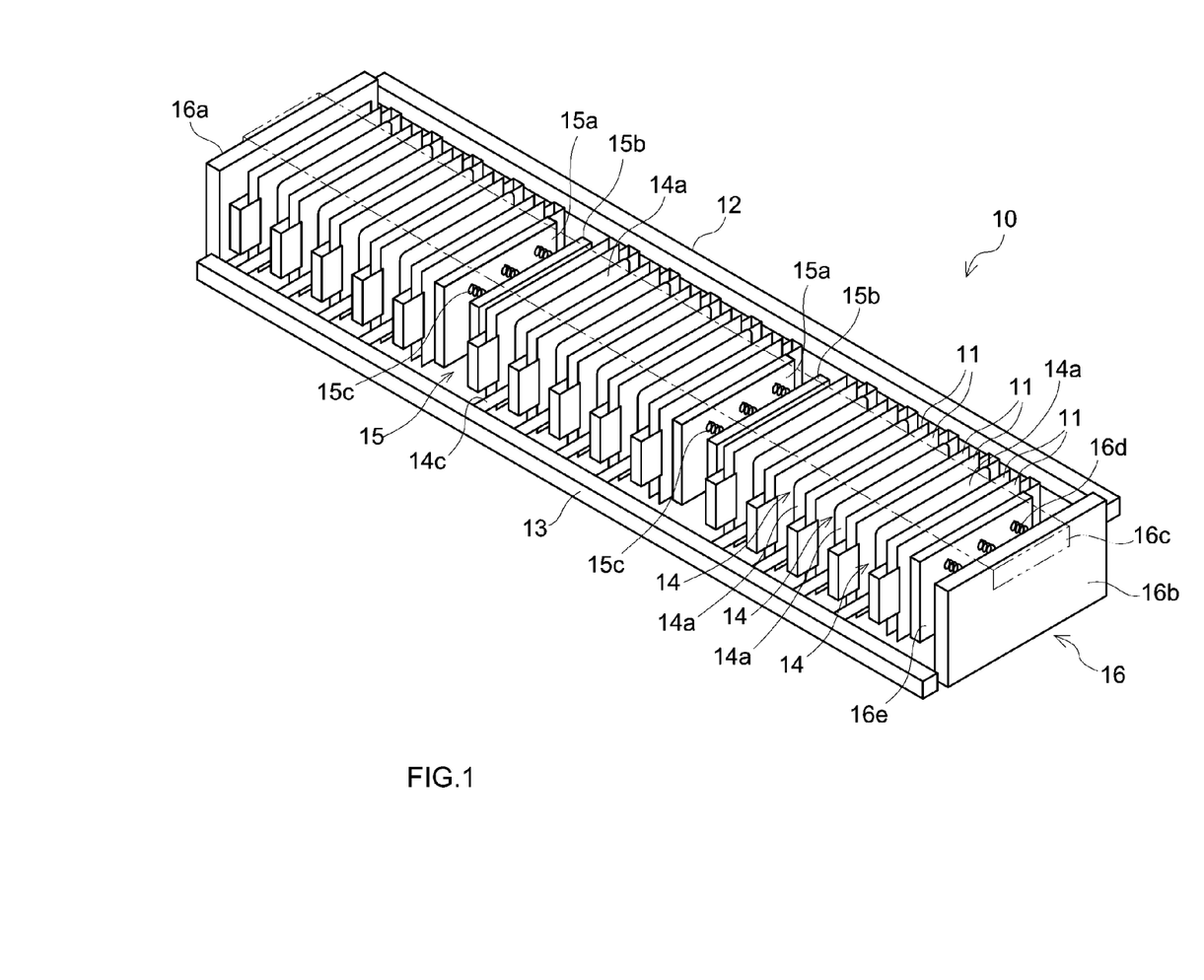
FIG. 1 is a perspective view schematically illustrating a battery pack 10 according to the present disclosure.

FIG. 1 is a perspective view schematically illustrating a battery pack 10 disclosed herein. As illustrated in FIG. 1, a battery pack 10 disclosed herein includes a plurality of cells 11, a refrigerant supply pipe 12, a refrigerant recovery pipe 13, a plurality of cooling members 14, a clearance adjusting unit 15, and a restraining unit 16.

Cell 11

Each of the plurality of cells 11 includes a pair of planar portions opposed to each other, and adjacent ones of the cells 11 are arranged so that the planar portions of the adjacent ones of the cells 11 face each other. Each of the cells 11 is a unit cell that constitutes a battery pack. In the present description, the term "battery" is intended to mean any electricity storage device in general that is capable of providing electric energy therefrom, which is intended to include primary batteries and secondary batteries. The term "secondary battery" refers to a repeatedly chargeable electricity storage device in general, and it is intended to encompass what is called storage batteries (chemical cells), such as lithium-ion secondary batteries, nickel-metal hydride batteries, and nickel-cadmium batteries, as well as capacitors (i.e., physical cells) such as electric double-layer capacitors.

Figure 2:
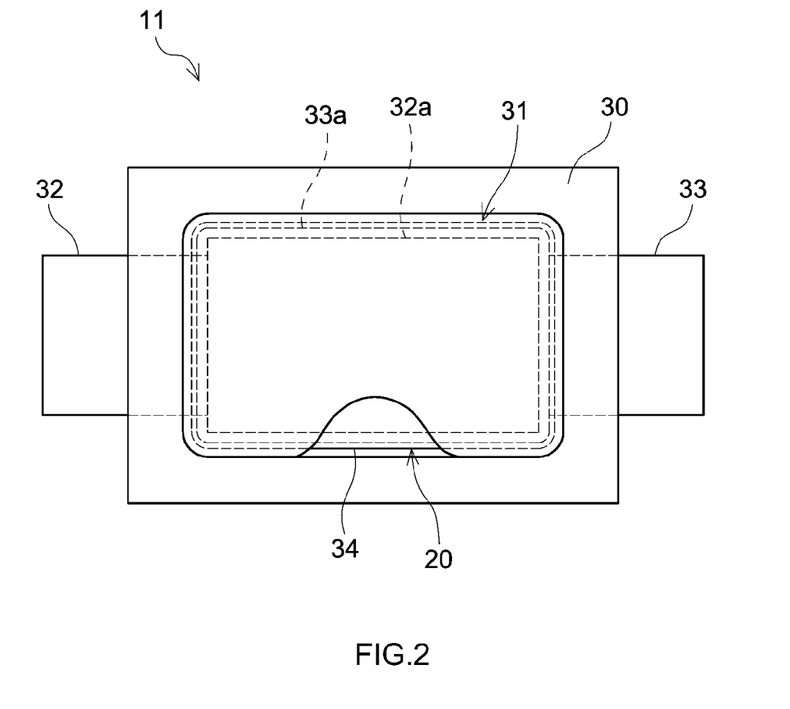
FIG. 2 is a plan view of the cell 11.

FIG. 2 is a plan view of the cell 11. In this embodiment, the cell 11 is a laminate-type cell in which an electrode assembly 20 is covered with a laminate film. FIG. 2 depicts an illustration in which a part of the laminate film is cut out and the electrode assembly 20 is partially exposed. The cell 11 is an all-solid-state battery. The all-solid-state battery includes an electrolyte that is composed of a solid electrolyte. In order to allow the charge carriers to be transferred smoothly through the solid electrolyte and keep the resistance low, the all-solid-state battery requires that an appropriate pressure be applied to the electrode assembly 20 so that sufficient contact is ensured between the electrode active materials and the solid electrolyte. On the other hand, the expansion during charge and the contraction during discharge are considerable. In addition, the cell 11 generates heat during charge and discharge. It is preferable that the battery pack 10 be able to keep the temperature variations small between the plurality of cells 11 that are incorporated into the battery pack 10.

In this embodiment, the cell 11 is a laminate-type cell in which the entire circumference of the electrode assembly 20 is covered with a laminate film 30. As illustrated in FIG. 2, the cell 11 includes planar portions 31, a positive electrode terminal 32, and a negative electrode terminal 33.

The planar portions 31 are parts of the cell 11 in which the electrode assembly 20 is enclosed. In this embodiment, each of the cells 11 is composed of an all-solid-state battery. The electrode assembly 20 has a stacked structure in which, for example, a positive electrode current collector, a positive electrode layer 32a, a solid electrolyte layer 34, a negative electrode layer 33a, and a negative electrode current collector are stacked one on another, although some are not shown in the drawings In this embodiment, the outermost circumference of the electrode assembly 20 is covered by the solid electrolyte layer 34.

In this embodiment, as illustrated in FIG. 2, each of the planar portions 31 of the cell 11 is in a substantially rectangular shape, and each of the planar portions 31 is a part that covers a substantially rectangular flat electrode assembly. The laminate film seals the cell 11 so as to cover the circumference of the planar portions 31.

The electrode assembly 20, which is to be enclosed in the planar portions 31, includes the positive electrode current collector (not shown) stacked in the electrode assembly 20, the positive electrode layer 32a staked on the positive electrode current collector, the solid electrolyte layer 34 stacked so as to cover the positive electrode layer 32a, the negative electrode layer 33a stacked on the solid electrolyte layer 34, and the negative electrode current collector (not shown). Each of the positive electrode current collector, the positive electrode layer 32a, the solid electrolyte layer 34, the negative electrode layer 33a, and the negative electrode current collector (not shown) is in a substantially rectangular shape. For simplicity in illustration, FIG. 2 does not show the positive electrode current collector and the negative electrode current collector.

The positive electrode layer 32a is a solid electrolyte layer containing a positive electrode active material. The negative electrode layer 33a is a solid electrolyte layer containing a negative electrode active material. The solid electrolyte layer 34 is a solid electrolyte layer containing no active material. Both the negative electrode layer 33a and the solid electrolyte layer 34 are slightly larger in size than the positive electrode layer 32a so that they cover the positive electrode layer 32a in a stacking direction.

Each of the planar portions 31 has a pair of opposing ends, and the positive electrode terminal 32 is disposed at one of the opposing ends while the negative electrode terminal 33 is disposed at the other end. The plurality of cells 11 are oriented alternately such that, in each adjacent pair of the cells 11, the positive electrode terminal 32 of one of the cells 11 and the negative electrode terminal 33 of the other are disposed on the same side.

The positive electrode current collector is provided with the positive electrode terminal 32. The negative electrode current collector is provided with the negative electrode terminal 33. The positive electrode terminal 32 protrudes from one end of the laminate film, in which the electrode assembly is enclosed. The negative electrode terminal 33 protrudes from the other end of the laminate film, in which the electrode assembly is enclosed. In the embodiment, the positive electrode terminal 32 is provided on one end of the planar portions 31, in which the electrode assembly is enclosed, and the negative electrode terminal 33 is provided on the other end of the planar portions 31.

Note that various proposals have been made for the laminate film for the laminate-type cell, the positive electrode active material, the negative electrode active material, and the solid electrolyte for constructing an all-solid-state battery, and there is no particular restriction on such components. In the present embodiment, each of the planar portions 31 of the cell 11 is in a substantially rectangular shape. However, unless specifically stated otherwise, the planar portions 31 of the cell 11 need not be in a substantially rectangular shape. In another embodiment, the positive electrode terminal 32 and the negative electrode terminal 33 may protrude in the same direction from the inside of the laminate film enclosing the electrode assembly. Thus, the position at which the positive electrode terminal 32 or the negative electrode terminal 33 protrudes from the inside of the laminate film enclosing the electrode assembly is not limited to the above-described embodiment, unless specifically stated otherwise.

Refrigerant Supply Pipe 12 and Refrigerant Recovery Pipe 13

As illustrated in FIG. 2, each of the plurality of cells 11 includes a pair of planar portions 31 opposed to each other. As illustrated in FIG. 1, the plurality of cells 11 are arranged such that planar portions 31 of adjacent ones of the cells 11 are in a face-to-face relationship and that the cooling members 14 are interposed. The refrigerant supply pipe 12 extends alongside the plurality of cells 11 arranged side by side, and along a direction in which the plurality of cells 11 are arranged. The refrigerant recovery pipe 13 extends alongside the plurality of cells 11 arranged side by side, and is disposed at a position different from the position where the refrigerant supply pipe 12 is disposed. Thus, each of the refrigerant supply pipe 12 and the refrigerant recovery pipe 13 is a pipe through which a refrigerant circulates. Each of the refrigerant supply pipe 12 and the refrigerant recovery pipe 13 is disposed so as to extend along a direction in which the plurality of cells 11 are arranged. In this embodiment, the refrigerant supply pipe 12 is disposed at a position higher than is the refrigerant recovery pipe 13.

Cooling Member 14

Figure 3:
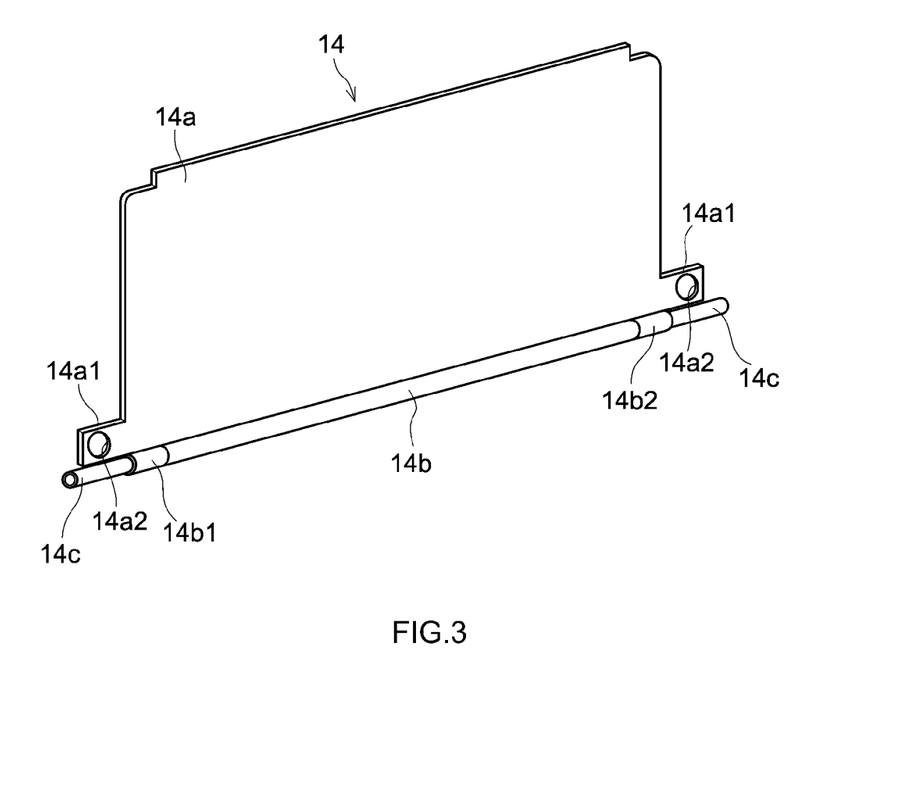
FIG. 3 is a perspective view illustrating a cooling member 14.

FIG. 3 is a perspective view illustrating a cooling member 14. As illustrated in FIG. 3, the cooling member 14 includes a heat transfer plate 14a, a refrigerant flow passage 14b, and flexible tubes 14c (a first flexible tube and a second flexible tube). In this embodiment, the battery pack 10 also includes a guide 18 (see FIG. 4) that movably guides the cooling member 14 along the direction in which the plurality of cells 11 are arranged.

Heat Transfer Plate 14a

Figure 4:
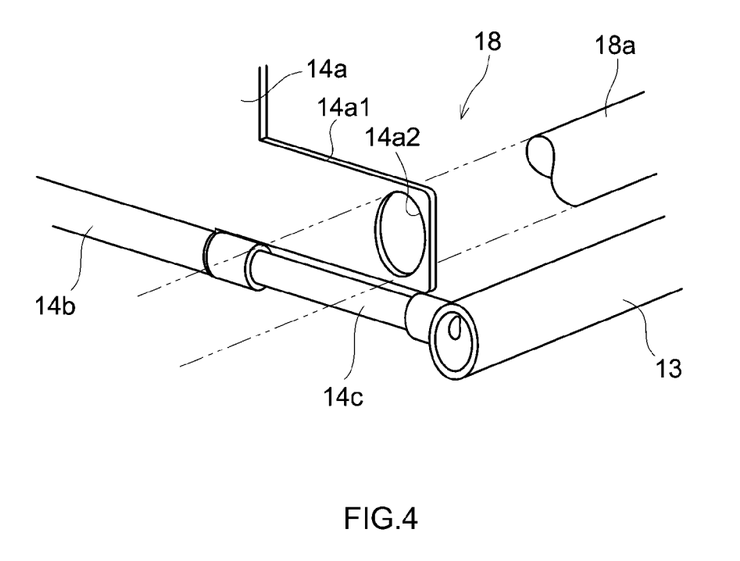
FIG. 4 is an enlarged perspective view illustrating a protruding portion 14a1 that protrudes from the cell 11.

The heat transfer plate 14a is a rectangular-shaped plate that is capable of covering the planar portions 31 of the cell 11. In this embodiment, the heat transfer plate 14a is made of aluminum or an aluminum alloy, taking appropriate thermal conductivity and weight reduction into consideration. In this embodiment, a portion of the heat transfer plate 14a extends such as to protrude from the cell 11. FIG. 4 is an enlarged perspective view illustrating a protruding portion 14a1 that protrudes from the cell 11. As illustrated in FIG. 4, a shaft insertion hole 14a2 is formed in that portion.

Guide 18

The guide 18 that guides the heat transfer plates 14a includes a shaft 18a extending along a direction in which the plurality of cells 11 are arranged. In FIG. 4, a portion of the shaft 18a is imaginarily indicated by dash-dot-dot lines. The shaft 18a is inserted through a shaft insertion hole 14a2 of the heat transfer plate 14a. As illustrated in FIG. 3, the guides 18 (each including the shaft 18a and the shaft insertion hole 14a2 in this embodiment) that guide the heat transfer plate 14a may be disposed at respective positions that protrude in opposite directions from the region of the heat transfer plate 14a on which the cell 11 is placed. This allows the heat transfer plate 14a to stably move along a direction in which the plurality of cells 11 are arranged. The heat transfer plates 14a may move, for example, according to the expansion and contraction of the cell 11. Note that the guide 18 and the shaft 18a are not shown in FIG. 1. Because the heat transfer plates 14a are configured to be movable relative to the shaft 18a, a lubricant, such as grease, may be applied suitably to the shaft 18a.

Refrigerant Flow Passage 14b

The refrigerant flow passage 14b is attached to one side of the heat transfer plate 14a. The refrigerant flow passage 14b is a flow passage through which a refrigerant (for example, water) is circulated. The heat transfer plate 14a is cooled by the refrigerant that is circulated through the refrigerant flow passage 14b. In this embodiment, one side of the heat transfer plate 14a juts out from the cell 11, and the refrigerant flow passage 14b is attached to the one side. Respective flexible tubes 14c are attached to opposite ends of the refrigerant flow passage 14b respectively via joints 14b1 and 14b2. One end of the refrigerant flow passage 14b is connected to the refrigerant supply pipe 12 (see FIG. 1) via one of the flexible tubes 14c. The other end of the refrigerant flow passage 14b is connected to the refrigerant recovery pipe 13 via the other one of the flexible tubes 14c, as illustrated in FIG. 1. The flexible tubes 14c are the pipes that connect the refrigerant flow passage 14b to the refrigerant supply pipe 12 and the refrigerant recovery pipe 13. The flexible tubes 14c can deform according to the relative displacement of the refrigerant flow passage 14b relative to the refrigerant supply pipe 12 and the refrigerant recovery pipe 13. Herein, the flexible tube 14c that is connected to the refrigerant supply pipe 12 and the refrigerant flow passage 14b is referred to, when appropriate, as a first flexible tube. The flexible tube 14c that is connected to the refrigerant flow passage 14b and the refrigerant recovery pipe 13 is referred to, when appropriate, as a second flexible tube.

In this embodiment, the cooling members 14 are disposed between adjacent sets of cells 11, wherein each adjacent set of cells 11 includes an adjacent pair of the plurality of cells 11. This embodiment is merely an example, and it is also possible that the cooling members 14 may be disposed respectively between adjacent one of the cells 11.

Clearance Adjusting Unit 15

As illustrated in FIG. 1, the clearance adjusting units 15 are disposed intermittently between sets of adjacent pairs of cells 11, along the direction in which the plurality of cells 11 are arranged. In this embodiment, each of the cooling members 14 is disposed between each pair of two adjacent cells 11. The clearance adjusting units 15 are disposed intermittently between sets of adjacent pairs of cells 11.

Each of the clearance adjusting units 15 includes a pair of plates 15a and 15b, which are respectively placed against the planar portions 31 of the cells 11 adjacent to the clearance adjusting unit 15, and an elastic body 15c, which is disposed between the pair of plates 15a and 15b. Although the elastic body 15c may be a metal spring, the elastic body 15c may be broken if the applied force thereto exceeds the elastic range. From this viewpoint, when the applied force is great, it is possible to employ a non-metallic spring, such as resin spring or rubber, that has required mechanical properties.

Note that the number of cells 11 that are arranged between a pair of clearance adjusting units 15 may be set to a number that can be divided by the number of cells 11 that are connected in parallel (also referred to as the "parallel-connection number"). This makes connection of the cells 11 easier. For example, when two cells 11 are connected in parallel to form a cell group and a plurality of cell groups, each including the two parallel connected cells, are connected in series, the number of the cells 11 arranged between a pair of cooling members 14 may be set to a multiple of 2, such as 10, 8, and 6. In another example, when three cells 11 are connected in parallel to form a cell group and a plurality of cell groups, each including the three parallel connected cells, are connected in series, the number of the cells 11 arranged between a pair of cooling members 14 may be set to a multiple of 3, such as 12, 9, and 6.

Restraining Unit 16

As illustrated in FIG. 1, the restraining unit 16 includes a pair of restraining members 16a and 16b, and a support member 16c that supports the restraining members 16a and 16b. In FIG. 1, the support member 16c is indicated by dash-dot-dot lines. In this embodiment, the pair of restraining members 16a and 16b are members that restrain opposite ends of the plurality of arranged cells 11, which are arranged side by side with the interposed cooling members 14 (the heat transfer plates 14a in this embodiment). The restraining members 16a and 16b may also be referred to as end plates. The support member 16c in this embodiment is a metal band spanning between the pair of restraining members 16a and 16b. The support member 16c may also be referred to as a restraining band.

In this embodiment, the restraining member 16b, which is at one end of the restraining unit 16, is fitted with elastic bodies 16d and a pressing plate 16e. Each of the elastic bodies 16d may be a similar member to the elastic body 15c of the clearance adjusting unit 15. The pressing plate 16e is a plate that abuts a flat plate portion of the cell 11 that faces the restraining member 16b, which is at the one end. The elastic bodies 16d are disposed in a compressed state between the pressing plate 16e and the restraining member 16b at the one end. In the battery pack 10, a required restraining force is applied to the plurality of arranged cells 11 by the restraining unit 16. Because a required restraining force is applied to the cells 11, the transfer of charge carriers through the solid electrolyte is made smoother, and the resistance is kept low. On the other hand, the plurality of cells 11 undergo considerable expansion during charge and considerable contraction during discharge. Particularly when each of the cells 11 is an all-solid-state cell, the restraining force is great and also the expansion and contraction during charge and discharge are great.

In that case, if no clearance adjusting unit 15 is provided and the elastic bodies 16d are merely attached to the restraining member 16b at one end of the restraining unit 16, the cell 11 that is disposed at the end opposite to the end provided with the elastic bodies 16d undergoes a significant amount of movement. In other words, the amount of movement of the just-mentioned cell 11 is the cumulative amount of displacement of the plurality of cells 11 resulting from the expansion and contraction of the plurality of cells 11. In addition, the amount of movement of each of the cooling members 14 fitted between the cells 11 is correspondingly large according to the displacement of the cells. When the amount of movement of each of the cooling members 14 is large, the amount of displacement of each of the cooling members 14 is correspondingly large relative to the refrigerant supply pipe 12 and the refrigerant recovery pipe 13. As a consequence, the amount of displacement of the flexible tubes 14c attached to the refrigerant flow passage 14b of the cooling member 14 is also large.

In the battery pack 10 shown in FIG. 1, the clearance adjusting units 15 are disposed, along a direction in which the plurality of cells 11 are arranged, intermittently between adjacent cells 11. Thus, the gap between the pair of plates 15a and 15b of each of the clearance adjusting units 15 changes according to the expansion and contraction of the cells 11. This serves to keep the displacement of each of the cells 11 small relative to the refrigerant supply pipe 12 and the refrigerant recovery pipe 13. Because the clearance adjusting units 15 are provided in this way, the displacement of the cells 11 can be kept small. As a result, the amount of displacement of each of the cooling members 14 is correspondingly made smaller relative to the refrigerant supply pipe 12 and the refrigerant recovery pipe 13. Furthermore, the amount of displacement of the flexible tubes 14c attached to the refrigerant flow passage 14b of the cooling member 14 is made smaller accordingly. Because the amount of displacement of the flexible tubes 14c is made smaller, the freedom in design is increased. Furthermore, in cases where the guide is provided, the displacement of the heat transfer plates 14a is reduced. Therefore, wear of the guide and the amount of the lubricant used, for example, are reduced.

The battery pack 10 is not limited to the embodiment shown in FIG. 1. For example, when the number of the plurality of cells 11 that are arranged side by side is larger, an appropriate number of clearance adjusting units 15 may be provided. In addition, one of the pair of plates 15a and 15b of the clearance adjusting unit 15 (for example, the plate 15a) may be disposed immovably relative to the restraining members 16a and 16b of the restraining unit 16. When this is the case, the other one of the plates (for example, the plate 15b) may be disposed relatively movably relative to the restraining members 16a and 16b. In that case, because the plate 15a, the one of the plates of the clearance adjusting unit 15, is disposed immovably, the maximum amount of movement of the cells 11 between a pair of the clearance adjusting units 15 is limited, so that the amount of displacement of the flexible tubes 14c is kept small. The plate 15a that is disposed immovably may be fixed to, for example, a portion of the restraining unit 16 [for example, the support member 16c (restraining band)].

Various embodiments of the battery pack have been described hereinabove according the present disclosure. Unless specifically stated otherwise, the embodiments of the battery pack described herein do not limit the scope of the present invention.

For example, the arrangements of the refrigerant supply pipe 12 and the refrigerant recovery pipe 13 and the structure of the cooling member 14 are not limited to those described in the foregoing embodiments. Although not illustrated in the drawing figures, both the refrigerant supply pipe 12 and the refrigerant recovery pipe 13 may be disposed on the same side relative to the plurality of arranged cells. When this is the case, the shape of the heat transfer plate 14a of the cooling member 14, the arrangement of the refrigerant flow passage 14b, and the arrangement of the flexible tubes 14c, for example, may be altered appropriately according to the arrangement of the refrigerant supply pipe 12 and the refrigerant recovery pipe 13.

What is claimed is:

1. A battery pack comprising:
a plurality of cells;
a refrigerant supply pipe;
a refrigerant recovery pipe;
a plurality of cooling members;
one or more clearance adjusting units; and
a restraining unit, wherein:
each of the plurality of cells includes a pair of planar portions opposed to each other, and the plurality of cells are arranged such that planar portions of each adjacent pair of the cells are in a face-to-face relationship;
the refrigerant supply pipe extends alongside the plurality of cells arranged side by side, and along a direction in which the plurality of cells are arranged;
the refrigerant recovery pipe extends alongside the plurality of cells arranged side by side, and along the direction in which the plurality of cells are arranged, the refrigerant recovery pipe disposed at a position different from a position where the refrigerant supply pipe is positioned; and
each of the cooling members comprises:
a heat transfer plate disposed between each adjacent pair of the cells or between a set of adjacent pairs of the cells wherein the set of adjacent pairs of the cells includes a plurality of adjacent pairs of the cells;
a refrigerant flow passage attached to the heat transfer plate;
a first flexible tube connected to the refrigerant supply pipe and the refrigerant flow passage; and
a second flexible tube connected to the refrigerant flow passage and the refrigerant recovery pipe; and
the one or more clearance adjusting units are disposed intermittently between adjacent pairs of the cells or between sets of adjacent pairs of the cells, along the direction in which the plurality of cells are arranged; and
each of the one or more clearance adjusting units includes:
a pair of plates respectively placed against respective planar portions of the cells adjacent thereto; and
an elastic body disposed between the pair of plates; and
the restraining unit includes a pair of restraining members and a support member supporting the pair of restraining members, the pair of restraining members restraining opposite ends of the plurality of cells arranged with the plurality of cooling members interposed.

2. The battery pack according to claim 1, further comprising a guide configured to movably guide the plurality of cooling members in a direction in which the plurality of cells are arranged.

3. The battery pack according to claim 1, wherein one of the pair of the plates is disposed immovably relative to the restraining member, and the other one of the pair of the plates is disposed movably relative to the restraining member.

4. The battery pack according to claim 1, wherein each of the cells is a laminate-type cell including an electrode assembly and a laminate film covering the electrode assembly.

5. The battery pack according to claim 4, wherein each of the cells is an all-solid-state cell.

\* \* \* \* \*